Dec. 9, 1969     E. A. DAVIS     3,483,287

TRANSFER MOLDING METHOD

Original Filed April 12, 1966

INVENTOR.
EDWARD A. DAVIS
BY Joseph Januszkiewicz
ATTY.

United States Patent Office 3,483,287
Patented Dec. 9, 1969

3,483,287
TRANSFER MOLDING METHOD
Edward A. Davis, Akron, Ohio, assignor to The B. F. Goodrich Company, New York, N.Y., a corporation of New York
Original application Apr. 12, 1966, Ser. No. 542,036, now Patent No. 3,372,436, dated Mar. 12, 1968. Divided and this application Jan. 11, 1968, Ser. No. 697,238
Int. Cl. B29f *1/06;* B29g *3/00*
U.S. Cl. 264—297         4 Claims

ABSTRACT OF THE DISCLOSURE

The method of injection molding which utilizes a deformable heat resistant pressure pad between the ram and the die member of the mold such that the pad seals off the edges of the sprues and enters the sprues and exerts pressure on the moldable material located in the sprues of the mold cavities causing the flow of such moldable material into the mold cavities without excess waste in the moldable material.

CROSS REFERENCE TO RELATED APPLICATIONS

This application is a division of my copending application Ser. No. 542,036, filed Apr. 12, 1966 and now Patent No. 3,372,436.

BACKGROUND OF THE INVENTION

This invention relates to a method of molding and more particularly to the novel method for injection molding.

In the process of transfer molding as practiced in the art, the uncured stock is located beneath the surface of the pressure ram between the sprues and the ram. Sufficient pressure is then generated by the downward movement of the ram to cause the stock to flow through the sprues into the cavities to form the desired object. Such pressure generated by the ram seals the cavities from excess rubber flow which would cause flash formation. However, an undesirable feature of such process was an exceptionally high ratio of cured scrap which resulted in the volume of stock necessary to be located above the sprues to assure sufficient flow of material. Ordinarily such scrap cured stock would form a pad between the ram and the die portion filling completely the sprues which is the cured scrap material.

SUMMARY OF THE INVENTION

The present invention contemplates a novel method which eliminates the high ratio of cured scrap necessitated by the previously described methods by utilizing a deformable pressure pad located between the ram and the sprues of the die wherein the sprues accommodate biscuits of moldable material which material is forced by the transfer molding process through the lower portion of the sprues into the cavity mold.

An object of this invention is to provide a novel method of transfer molding.

It is an object of this invention to provide a new and improved method for use in injection or transfer molding which eliminates the high ratio of uncured stock to the finished product.

Still a further object of this invention is that the method arrangement for injection molding may easily be carried on by conventional presses without expensive modification thereof.

A further object of this invention is to provide an economical transfer molding process which has a small ratio of scrap cured stock to finished product.

These and other objects achieved by this invention will become apparent as this invention proceeds with the accompanying drawings.

DETAILED DESCRIPTION

Figures 1, 2:
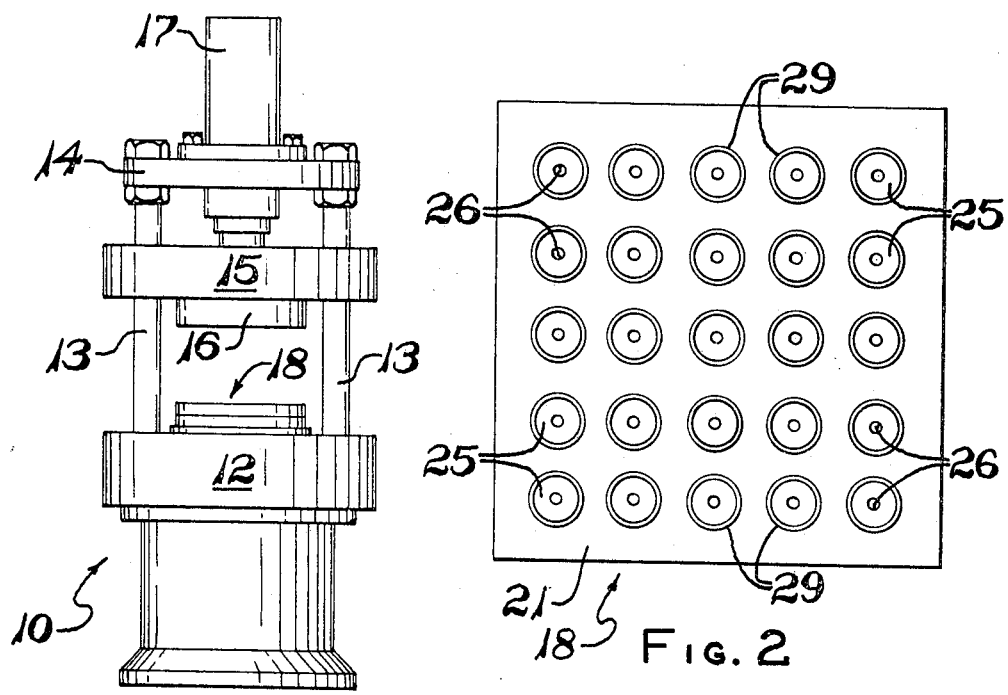
FIG. 1 is a simple diagrammatic view of a molding press.
FIG. 2 is a plan view of a multiple cavity die plate.
Figures 3, 4:
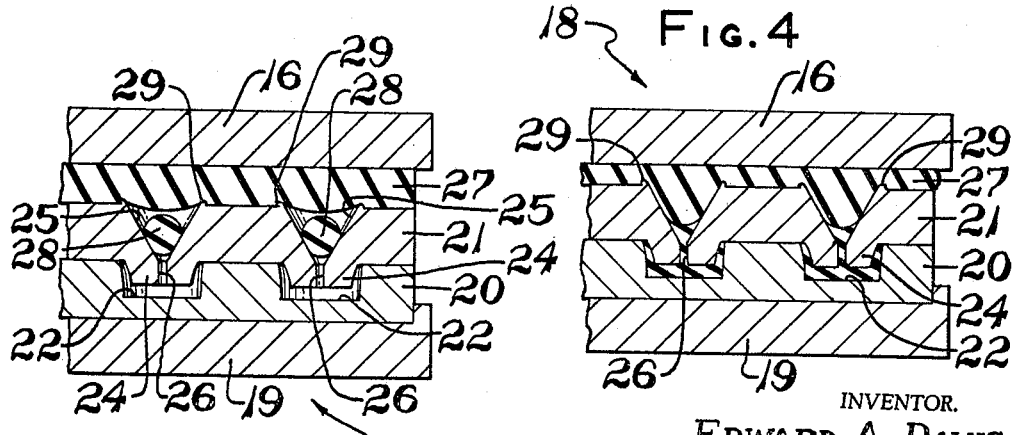
FIG. 3 is a fragmentary cross sectional view of the die plate, pressure pad and ram showing the relationship of the biscuits of moldable material prior to the molding operation.
FIG. 4 is a cross sectional view similar to that of FIG. 3 in which the ram compresses the pressure pad causing a flow of the moldable material into the mold cavity.

Referring now to the drawings, FIG. 1 discloses a molding press 10 of simple construction provided with a stationary lower platen 12 provided with a plurality of upright guide rods 13 which carry a cross head 14 fastened thereto by suitable means. Slidably mounted on the guide rods 13 is an upper platen 15 with a ram 16 which is movable toward and away from the lower platen 12 by means of a conventional hydraulic cylinder 17 rigidly connected to the cross head 14. Upper pressure platen 15 and lower platen 12 are provided with a plurality of steam channels for heating the molding apparatus and mold during the operation of the press. Suitably mounted on the lower platen 12 is a mold 18 illustrated as being of a three-part construction and comprises a bottom plate or section 19, a cavity plate or section 20, and a sprue plate or section 21. The cavity plate 20 is provided with a plurality of cavities 22 which cooperate with the projections 24 on the sprue plate 21 to define a mold cavity of the desired configuration of the finished product. It will be understood that the shape of the mold cavity will depend on the shape and construction of the article being molded. The mold shown is used to mold piston cups. The sprue plate 21 has a plurality of downwardly extending conical cavities 25 which connect via sprues 26 with the respective cavities 22. The juncture between the lower-most end portion of the sprues 26 and the respective cavities 22 is such that upon separation of the sprue plate 21 from the cavity plate 20 by any of the conventional automated practices upon completion of the operation removes the cured scrap rubber or moldable material upwardly away from the finished article leaving the completed article in a finished flashless condition. The mating surfaces between the sprue plate 21 and the cavity plate 20 are such that minute grooves therebetween permit pressurized gases to escape therethrough facilitating the flow of moldable material through the sprues 26 into the cavities 22 to fill such cavities and mold a finished product to exact dimensions without flash. As shown in FIGURE 3, a presure heat-resistant deformable pad 27 located between the sprue plate 21 and the ram 16 facilitates the molding of the finished product in a manner to be described.

In the operation thereof, the assembled mold 18 is placed on the lower platen 12 and the biscuits of moldable material 28 are placed as by a jig or some other suitable means into the respective conical cavities 25. Thereafter, the pressure pad 27 molded from heat-resistant rubber is placed on the sprue plate 21 covering the sprue openings. The hydraulic press is now operated through hydraulic cylinder 17 to lower the ram 16 downwardly forcing the ram 16 into contact with the pressure pad 27 which pressure deforms the pad so that it forms a seal around the edges of the sprues and enters the sprues to compress the biscuits 28 of moldable material to cause the flow of such material. The biscuits of moldable material flow downwardly through the respective sprues 26 into engagement with the walls of the opening of the cavity 22 and fill the cavities with portions thereof extending upwardly into the sprues as illustrated in FIGURE 4. The press is left in its closed position until the moldable material is cured after which the ram 16 is retracted to its uppermost position as shown in FIGURE 1 and the cavity plate 20 is separated from the sprue plate 21 by any suitable means such as having the sprue plate 21 suitably hinged at its rear-end portion and having suitable pneumatic cylinders connected to the forward-end portion of the sprue plate 21. The separation of the sprue plate from the cavity plate 20 exposes the finished product separated from the cured scrap moldable material. The finished products may be removed easily from the cavity plate 20 as by a tilting operation and the scrap stock in the respective sprues 26 may be cleaned out as by a blast of air, thereby conditioning the apparatus for the next cycle of operation. To facilitate the operation of the present invention each sprue 26 has a sealing ring 29 extending circumferentially around the surface portion which is in engagement with the pressure pad 27 during the molding operation, which action facilitates the flow of material into the respective cavity molds, thereby eliminating the great quantity of scrap moldable material as heretofore experienced.

It should be understood, of course, that the foregoing disclosure relates to only a preferred embodiment of the invention and that numerous modifications or alterations may be made therein without departing from the spirit and the scope of the invention.

I claim:
1. A method of producing moldings comprising the steps of locating a plurality of moldable stock in the sprues of a molding apparatus, applying pressure from a ram to a deformable heat-resistant pad so that the pad seals off the edges of the sprues and enters the sprues to force the moldable stock in said sprues to flow into the mold cavities below said sprues, and applying heat to said molding apparatus.

2. A method of molding a plurality of articles comprising the steps of locating moldable material in the sprues of mold cavities between a die having such mold cavities and a ram, positioning a heat-resistant pad between such die having such moldable material and said ram, applying pressure to said ram onto said pad so as to cause the pad to seal off the edges of the sprues and enter the sprues to force the flow of such moldable material through the sprues into such molds and applying heat to such dies to vulcanize the material in such cavities.

3. The method of molding a plurality of piston cups comprising the steps of locating a plurality of molds with the upper portions of the sprues thereof in coplanar relationship, positioning moldable stock in the respective sprues, applying pressure to the respective individual moldable stock from a deformable pad which seals off the edges of the sprues and enters the sprues to effect flow of the respective pieces of stock into the mold cavities below such sprues, and applying heat to said molds to effect vulcanization thereof.

4. The method of molding comprising the steps of locating moldable stock in the sprue of a molding apparatus, applying pressure to the stock from a deformable pad that seals off the edges of the sprue and enters the sprue to effect the flow of the stock into the mold cavity below such sprue, and applying heat to said stock.

References Cited

UNITED STATES PATENTS

| | | | |
|---|---|---|---|
| 2,536,689 | 1/1951 | Krebs et al. | 264—313 X |
| 2,641,023 | 6/1953 | Heijne den Bak et al. | 264—320 |
| 2,962,764 | 12/1960 | Trojanowski et al. | 264—316 X |
| 3,262,155 | 7/1966 | Alexander | 264—314 X |

FOREIGN PATENTS

| | | |
|---|---|---|
| 1,033,125 | 6/1966 | Great Britain. |
| 1,203,941 | 10/1965 | Germany. |

OTHER REFERENCES

Ser. No. 346,897, Morita, A.P.C., published Apr. 27, 1943.

ROBERT F. WHITE, Primary Examiner

N. RUSHEFSKY, Assistant Examiner

U.S. Cl. X.R.

264—316, 328